United States Patent [19]

Ojo et al.

[11] Patent Number: 5,616,170
[45] Date of Patent: Apr. 1, 1997

[54] ADSORPTIVE SEPARATION OF NITROGEN FROM OTHER GASES

[75] Inventors: Adeola F. Ojo, Chatham; Frank R. Fitch, Bedminister; Martin Bülow, Basking Ridge, all of N.J.

[73] Assignee: The BOC Group, Inc., New Providence, N.J.

[21] Appl. No.: 515,184

[22] Filed: Aug. 11, 1995

[51] Int. Cl.⁶ ................................................. B01D 53/047
[52] U.S. Cl. ........................ 95/101; 95/96; 95/130; 95/902; 502/65; 502/66; 502/71; 502/73; 502/74
[58] Field of Search ............... 95/96–105, 130, 95/902; 502/61, 65, 66, 71, 73, 74, 77, 78

[56] References Cited

U.S. PATENT DOCUMENTS

| | | | |
|---|---|---|---|
| 2,882,244 | 4/1959 | Milton | 95/902 X |
| 3,140,932 | 7/1964 | McKee | 95/902 X |
| 3,140,933 | 7/1964 | McKee | 95/130 |
| 3,965,043 | 6/1976 | Stridde | 502/61 |
| 4,588,701 | 5/1986 | Chiang et al. | 502/65 |
| 4,824,816 | 4/1989 | Trowbridge et al. | 502/66 |
| 4,859,217 | 8/1989 | Chao | 95/130 |
| 4,874,729 | 10/1989 | Klazinga | 502/61 |
| 4,925,460 | 5/1990 | Coe et al. | 95/130 X |
| 4,943,304 | 7/1990 | Coe et al. | 95/130 |
| 5,064,630 | 11/1991 | Verduijn et al. | 502/61 X |
| 5,152,813 | 10/1992 | Coe et al. | 95/103 |
| 5,174,979 | 12/1992 | Chao et al. | 95/130 X |
| 5,258,060 | 11/1993 | Gaffney et al. | 95/130 X |
| 5,266,102 | 11/1993 | Gaffney et al. | 95/130 X |
| 5,354,360 | 10/1994 | Coe et al. | 95/130 X |
| 5,464,467 | 11/1995 | Fitch et al. | 95/130 X |

FOREIGN PATENT DOCUMENTS

| | | | |
|---|---|---|---|
| 2-207838 | 8/1990 | Japan | 95/130 |
| 1139405 | 1/1969 | United Kingdom | 95/902 |

*Primary Examiner*—Robert Spitzer
*Attorney, Agent, or Firm*—Coleman R. Reap; Larry R. Cassett

[57] ABSTRACT

Chabazite, offretite, erionite, levyne, mordenite, gmelinite, zeolite A, zeolite T, EMC-2, ZSM-3, ZSM-18, ZK-5, zeolite L, and beta zeolite whose exchangeable cations are composed of 95 to 50% lithium ions, 4 to 50% of one or more of aluminum, cerium, lanthanum and mixed lanthanides and 0 to 15% of other ions are prepared by ion-exchanging the base zeolite with water-soluble trivalent ion salts and with water soluble lithium salts. The zeolites preferentially adsorb nitrogen from gas mixtures.

25 Claims, No Drawings

ADSORPTIVE SEPARATION OF NITROGEN FROM OTHER GASES

FIELD OF THE INVENTION

This invention relates to the preparation of novel zeolites and more particularly to the preparation of novel nitrogen selective lithium- and trivalent ion-exchanged forms having superior thermal stability. The invention also relates to the separation of nitrogen from less strongly adsorbed gases by means of the novel lithium- and trivalent ion-exchanged zeolites.

BACKGROUND OF THE INVENTION

The separation of nitrogen from other gases, such as oxygen, argon and hydrogen, is of considerable industrial importance. When the separation is conducted on a large scale fractional distillation is often employed. Distillation is quite expensive, however, because of the large initial capital cost of equipment and the considerable energy requirement involved. In recent times other separation methods have been investigated in efforts to reduce the overall cost of such separations.

An alternative to distillation that has been used to separate nitrogen from other gases is adsorption. For example, sodium X zeolite, described in U.S. Pat. No. 2,882,244 to Milton, has been used with some success for the adsorptive separation of nitrogen from oxygen. A disadvantage of the use of sodium X zeolite for the separation of nitrogen from oxygen is that it has low separation efficiency for nitrogen separation.

According to McKee, U.S. Pat. No. 3,140,933, an improvement in nitrogen adsorption results when some of the base sodium ions are replaced with lithium ions. This patent discloses that type X zeolite having base ions replaced by lithium ions can be effectively used to separate nitrogen from oxygen at temperatures up to 30° C. Since the ion-exchange is not exhaustive and the X zeolites were synthesized using sodium as the templating agent, the partially ion-exchanged material used is mixed sodium/lithium zeolite.

U.S. Pat. No. 4,859,217 discloses that very good adsorptive separation of nitrogen from oxygen can be obtained at temperatures of 15° to 70° C. using a type X zeolite which has more than 88% of its ions present as lithium ions, particularly when a zeolite having an aluminum to silicon atomic ratio of 1 to 1.25 is used.

Unfortunately, lithium exchanged zeolites have very high affinities for water, and adsorbed water, even in small amounts, seriously diminishes the adsorption capacity of the zeolite. Accordingly, to secure optimum adsorption performance, it is necessary to activate the zeolite by heating it to temperatures as high as 600° to 700° C. to drive off as much adsorbed water as possible.

U.S. Pat. No. 5,179,979 asserts that lithium/alkaline earth metal X zeolites having lithium/alkaline earth metal molar ratios in the range of about 95:5 to 50:50 have thermal stabilities greater than the corresponding pure lithium zeolites and good adsorption capacities and selectivities.

U.S. Pat. No. 5,152,813 discloses the adsorption of nitrogen from gas mixtures using crystalline X-zeolites having a zeolitic Si/Al ratio $\leq 1.5$ and at least binary ion exchange of the exchangeable ion content with between 5 and 95% lithium and between 5 and 95% of a second ion selected from calcium, strontium and mixtures of these, the sum of the lithium and second exchangeable ion being at least 60%.

Lithium-exchanged natural mordenite is reported to be a good adsorbent for oxygen pressure swing adsorption (PSA) in papers by H. Minato and M. Watanabe, published in Scientific Paper, University of Tokyo, (1978), 28, 218, and S. Furuyama and K. Sato in the Journal of Physical Chemistry (1982), 86, 2498–2503.

U.S.Patent 4,925,460 discloses a process for the separation of gas mixtures, where the components differ in heats of adsorption, e.g. nitrogen from air utilizing chabazite (Si/Al ratio 2.1 to 2.8) in which greater than 65% of the cations have been exchanged with lithium ion. This patent also discloses a process for the preparation of the novel adsorbent.

U.S. patent application Ser. No. 08/287324, filed Feb. 14, 1994, now U.S. Pat. No. 5,464,467, discloses the preparation of nitrogen-selective lithium- and trivalent ion-exchanged type X zeolites.

Although X-type zeolites that are highly ion exchanged with lithium ions have excellent nitrogen adsorption properties they are expensive to produce. There is a need for adsorbents which have superior thermal stability and nitrogen adsorption properties and which can be produced at reasonable costs. The present invention provides a family of adsorbents having these characteristics.

SUMMARY OF THE INVENTION

According to a first aspect of the invention there are presented novel zeolitic compositions which have superior thermal stability characteristics and nitrogen adsorptive selectivity. The novel zeolites are chabazite, offretite, erionite, levyne, mordenite, gmelinite, zeolite A, zeolite T, EMC-2, ZSM-3, ZSM-18, ZK-5, zeolite L, beta zeolite, and mixtures of these whose exchangeable cations comprise, on an equivalents basis, about 50 to about 95% lithium, about 4 to about 50% of one or more selected trivalent ions, and 0 to about 15% and preferably 0 to about 10% of residual ions. The trivalent ions are selected from aluminum, scandium, gallium, indium, yttrium, iron (III), chromium (III), single lanthanides, mixtures of two or more lanthanides and mixtures of these. The optional residual exchangeable ions are generally one or more of sodium, potassium, ammonium, hydronium ions. Calcium, strontium, magnesium, barium, zinc and copper (II) ions may also be present as exchangeable cations at concentrations less than about 5%.

The minimum total percentage of lithium and trivalent ions associated with the zeolite as exchangeable cations, on an equivalents basis, is 85% and preferably 90%. The exchangeable cations present in the zeolite other than lithium and the trivalent ions mentioned above (if any such other cations are present) may be one or more of the above-mentioned residual ions, or they may be one or more of any other cations, or they may be mixtures of any of these. The only restriction on these other cations is that they must not adversely affect the utility of the zeolite as an adsorbent for nitrogen, or otherwise adversely affect the zeolite. These other cations may be present in an amount up to about 15% of the total of exchangeable cations, on an equivalents basis. In most preferred embodiments of the invention, the minimum percentage of lithium and trivalent ions serving as exchangeable cations is 95%.

In a preferred embodiment the zeolite is one in which, on an equivalents basis, about 70 to about 95% of the exchangeable cations are lithium ions, about 5 to about 30% are trivalent ions, and 0 to about 10% are residual ions.

In another preferred embodiment the trivalent ions are selected from aluminum, cerium, lanthanum, mixtures of two or more lanthanides in which the combined weight of lanthanum, cerium, praseodymium and neodymium ions present in the mixture comprises at least 50% of the total lanthanide ions on a molar basis, and mixtures of these.

In another preferred embodiment the residual exchangeable ions are selected from calcium, strontium, magnesium, zinc and mixtures of these, and these may be present in amounts less than about 5% based on the total number of exchangeable ions associated with the zeolite.

In a most preferred embodiment, the exchangeable cations consist substantially only of lithium and one or more of the above-mentioned trivalent ions. In other words, the zeolite contains no more than about 2% residual ions as exchangeable cations.

According to a second aspect of the invention, the above-described zeolite is used as an adsorbent to separate nitrogen from a gas mixture. The separation is effected by passing the gas mixture through at least one adsorption zone containing the adsorbent thereby preferentially adsorbing nitrogen from said gas mixture. The adsorption process is generally carried out at a temperature in the range of about −190° to about 70° C. and an absolute pressure in the range of about 0.7 to 15 bar.

In a preferred embodiment of this aspect of the invention, the adsorption process is cyclical and comprises the above-described adsorption step and the step of desorbing nitrogen from the adsorption zone(s). Preferred cyclical processes include pressure swing adsorption, temperature swing adsorption and combinations of these.

When the adsorption process is pressure swing adsorption, the adsorbent is generally regenerated at an absolute pressure in the range of about 100 to about 5000 millibar, and when it is temperature swing adsorption is generally regenerated at a temperature in the range of about 0° to about 300° C.

In other preferred embodiments the adsorption step is carried out at a temperature in the range of about −20° to about 50° C. and an absolute pressure in the range of about 0.8 to 10 bar.

In a most preferred embodiment of the invention, the adsorption process is used for separating nitrogen from a gas mixture comprising nitrogen and one or more of oxygen, argon, helium, neon and hydrogen.

In other preferred embodiments of the invention the adsorption bed regeneration step is effected by vacuum means or by purging the bed with one or more of an inert gas, the nonadsorbed gas product from the adsorption system, or by combinations of vacuum and purge regeneration; and bed repressurization is at least partly effected using the nonadsorbed gas from the adsorption system.

DETAILED DESCRIPTION OF THE INVENTION

The invention is useful for the separation of nitrogen from a gas mixture. The separation is effected by adsorption using an adsorbent which selectively adsorbs nitrogen relative to other gases in the mixture. Typical separations include the separation of nitrogen from the other components of air, such as oxygen and/or argon, helium, neon, hydrogen, etc. Preferred separations include the separation of nitrogen from oxygen or argon.

The novel adsorbents of the invention are chabazite, offretite, erionite, levyne, mordenite, gmelinite, zeolite A, zeolite T, EMC-2, ZSM-3, ZSM-18, ZK-5, zeolite L, beta zeolite, and mixtures of these having as most of the exchangeable cations, a mixture of lithium ions and trivalent ions selected from aluminum, scandium, gallium, yttrium, iron (III), i.e. ferric ion, chromium (III), i.e. chromic ion, indium ions and ions of the lanthanide series. The lanthanide series ions include lanthanum, cerium, praseodymium, neodymium, promethium, samarium, europium, gadolinium, terbium, dysprosium, holmium, erbium, thulium, ytterbium, and lutetium ions. Mixtures of any two or more of the above trivalent ions can also be used to make the adsorbent of the invention. Preferred trivalent cations include aluminum, cerium, lanthanum and lanthanide mixtures in which the combined concentrations of lanthanum, cerium, praseodymium and neodymium totals at least about 50%, and preferably at least about 75% of the total number of lanthanide ions in the mixtures.

The adsorbents of the invention are generally made from a base zeolite having sodium or ammonium ions as the exchangeable cations, i.e. ions which compensate the negative charge of the aluminosilicate lattice and which may be exchanged with lithium or trivalent ions using standard ion exchange procedures. It may be desirable to convert all of the exchangeable cations to a single cation species, preferably the sodium or ammonium ion form, prior to preparation of the adsorbents of the invention.

In the broadest embodiment of the invention, about 95 to about 50% of the exchangeable cations are lithium ions, about 4 to about 50% of the cations are trivalent ions, and 0 to about 15% are residual ions, i.e. ions associated with the zeolite as exchangeable cations other than lithium and the above-mentioned trivalent ions. The residual exchangeable ions may be present as a result of the procedure used to manufacture the cation exchanged zeolites of the invention, or they may be intentionally introduced into the zeolites to further modify their properties. In typical embodiments of the invention, about 70 to about 95% of the exchangeable cations are lithium ions, about 5 to about 30% of the cations are trivalent ions, and 0 to about 10% are residual ions. Generally, the residual exchangeable ions will be sodium, potassium, ammonium, hydronium, calcium, magnesium ions or mixtures of these. In some cases it may be desirable to use divalent cations, such as magnesium, calcium, strontium, barium, zinc or copper (II) ions as part or all of the residual exchangeable ions, since divalent ion-exchanged zeolites have better nitrogen adsorption properties than do the sodium and potassium ion forms of the zeolites. As noted above it is preferred to limit the presence of divalent cations to less than about 5% of the total exchangeable cations. In some cases it may not be possible under normal conditions to exchange all of the cations in a given zeolite structure with lithium and/or trivalent ions. In such cases a proportion of the charge-balancing cations are locked sites, i.e. they do not readily interact with adsorbed gases.

The novel adsorbents of the invention can be prepared, for example, by cation exchanging the adsorbent with a solution of lithium compounds and solutions of compounds of the above-mentioned trivalent ions. It is preferable, although not absolutely necessary, to use aqueous solutions of the exchange ions. Any water-soluble compound of the exchanging ions can be used. The preferred water soluble compounds of the ions are the salts,. particularly the chlorides, sulfates and nitrates. The most preferred salts are the chlorides because of their high solubilities and ready availability.

The order of cation exchange is not critical. A preferred procedure for cation exchange is to first exchange the base zeolite with one or more of the specified trivalent ions to a level of about 5 to about 50% of the initial exchangeable cations on an equivalents basis, and more preferably to a level of about 15 to about 30%, and then exchange the zeolite with lithium ions sufficiently to reduce the residual exchangeable ion level to less than 10%, and more preferably to less than 4%, and most preferably to less than 2%.

In some cases it may be desirable to filter and dry the trivalent-exchanged zeolite, and then calcine the partly exchanged zeolite at temperatures in the range of about 200° to about 650° C., and preferably at about 250° to about 550° C., under conditions in which hydrothermal damage is minimized, and then conduct the lithium exchange.

The lithium exchange of the trivalent-exchanged zeolite is preferably exhaustive, and is preferably carried out using an aqueous solution of lithium chloride, by stirring the lithium salt solution with the zeolite in the powdered form in a tank, or by contacting the lithium salt solution with the zeolite in pelletized form in a column.

A less preferred method of cation exchange is to first exchange the base zeolite with lithium ions to the desired extent and then exchange the lithium-exchanged zeolite with the desired trivalent ions. A third method is to simultaneously exchange the base adsorbent with lithium ions and the desired one or more trivalent ions.

The zeolites of the present invention can have a variety of physical forms, and the exact physical form of the product may affect its efficiency in PSA processes. When the zeolites of the present invention are to be used in industrial adsorbers, it may be preferred to aggregate (e.g. pelletize) the zeolite to control the macropore diffusion, as pulverulent zeolite may compact in industrial size adsorption column, thereby blocking, or at least significantly reducing flow through the column. Those skilled in molecular sieve technology are aware of conventional techniques for aggregating molecular sieves. Such techniques usually involve mixing the molecular sieve with a binder, which is typically a clay, thereby forming aggregates from the mixture, as by extrusion or bead formation, and then heating the formed aggregate to a temperature in the range of about 600° to about 700° C. to convert the green aggregate into a form which is resistant to crushing. The binders used to aggregate the zeolites may include clays, silicas, aluminas, metal oxides and mixtures thereof. In addition, the zeolites may be aggregated using materials such as silica-alumina, silica magnesia, silica-zirconia, silica-thoria, silica-beryllia, and silica-titania, as well as ternary compositions, such as silica-alumina-thoria, silica-alumina-zirconia and clays present as binders. The relative proportions of the zeolite and binder material may vary widely. Where the zeolite is to be formed into aggregates prior to use, such aggregates are desirably about 0.5 to about 5 mm in diameter. Aggregation may be effected before, after or between the trivalent metal and lithium ion-exchanges required to produce the zeolites of the present invention, e.g. one can first produce the lithium/trivalent metal zeolite and then effect aggregation, or one can use as the starting material for the ion-exchanges an X zeolite which is already in aggregate form. In general, the latter is preferred, since sodium X zeolite is more thermally stable than the lithium/trivalent metal zeolites of the present invention and hence less susceptible to damage from the high temperatures used in the aggregation process. However, it should be noted that activation of the lithium/trivalent metal zeolite is required even if the sodium zeolite used as starting material has been activated during the aggregation process. The temperature at which the adsorption step of the adsorption process is carried out depends upon a number of factors, such as the particular gases being separated, the particular adsorbent being used, and the pressure at which the adsorption is carried out. In general, the adsorption step is carried out at a temperature of at least about −190° C., preferably at a temperature of at least about −20° C., and most preferably at a temperature of at least about 15° C. The adsorption is generally carried out at temperatures not greater than about 70° C., and preferably not greater than about 50° C., and most preferably not greater than about 35° C.

The adsorption step of the process of the invention can be carried out at any of the usual and well known pressures employed for gas phase temperature swing adsorption and pressure swing adsorption processes. Typically the minimum absolute pressure at which the adsorption step is carried out is generally about 0.7 bar, preferably about 0.8 bar and most preferably about 0.9 bar. The adsorption is generally carried out at pressures not greater than about 15 bar, and preferably not greater than about 10 bar, and most preferably not greater than about 4 bar.

When the adsorption process is PSA, the pressure during the regeneration step is reduced, usually to an absolute pressure in the range of about 100 to about 5000 millibar, and preferably to an absolute pressure in the range of about 175 to about 2000 millibar, and most preferably to an absolute pressure in the range of about 200 to about 1100 millibar. When the adsorption process is TSA, the bed temperature is raised during bed regeneration. The regeneration temperature can be any temperature below which the adsorbent begins to degenerate. In general, the temperature of the adsorbent is usually raised during regeneration to a value in the range of about 0° to about 300° C., is preferably raised to a value in the range of about 25° to about 250° C., and is most preferably raised to a value in the range of about 70° to about 180° C. The regeneration procedure may be a combination of PSA and TSA, in which case both the pressure and temperature used during regeneration will be varied within the above-stated ranges.

The invention is further illustrated in the following examples wherein, unless otherwise stated, parts, percentages, and ratios are on a volume basis.

EXAMPLE 1

Preparation of trivalent ion, lithium zeolites

Highly crystalline and pure sodium-lithium ZSM-3 zeolite was synthesized in-house with Si/Al atomic ratio of 1.3 according to Zhdanov et al., U.S. S. R Patent No. SU 1731726 A1. Laposil 3000, Sodium mordenite was obtained from Laporte Inorganics, having a Si/Al atomic ratio of 6.3. These zeolites may be fully exchanged with lithium and trivalent cations.

These zeolite samples were first ion-exchanged with a trivalent commercial mixed rare-earth chloride solution supplied by Moly Corp., Inc. (with composition approximately 67% $LaCl_3$, 23% $NdCl_3$, 9% $PrCl_3$ and 1% $CeCl_3$) and then lithium- exchanged to the final product.

The rare-earth mixture ion-exchange was effected on powdered samples using a 0.003–0.009M rare-earth chloride solution containing the required quantity of trivalent cations. The ion-exchanges were carried out under static conditions at ambient temperature, after which the zeolites were washed with deionized water and dried at room temperature. Subsequently, lithium ion-exchanges were carried out on the resulting samples, using three static exchanges with 0.7–1.0M lithium chloride solution (adjusted to a pH of 9 with concentrated LiOH solution), each containing four-fold excesses of lithium ions over the quantity of the base cations remaining after rare-earth exchange. The exchanges were carried out at 79° C. for 20 hours. The final lithium-rare-earth exchanged samples were washed with a large volume of deionized water and dried in an oven at 110° C.

The samples were analyzed by Inductively Coupled Plasma Atomic Emission spectroscopy (ICP-AES) using a Perkin Elmer Optima 3000 ICP Spectrometer.

TABLE 1

Normalized Composition of trivalent ion, lithium zeolites of the invention

| Sample | $Tr^{3+}$ cation equivalent fraction | $Li^+$ cation equivalent fraction | $Na^+$ cation equivalent fraction |
|---|---|---|---|
| Li, Re-MOR | 0.06 | 0.83 | 0.11 |
| Li, Re-ZSM-3 | 0.05 | 0.91 | 0.01 |
| Li, Re-LTA | 0.07 | 0.92 | 0.01 |

MOR - mordenite
ZSM-3 - EMC-2/FAU zeolite mixture
LTA - zeolite A

TABLE 1A

Composition of trivalent ion, lithium exchanged zeolites of the invention

| Sample | $Tr^{3+}/Al_f$ equivalent ratio | $Li^+/Al_f$ equivalent ratio | $Na^+/Al_f$ equivalent ratio | $H^+/Al_f$ equivalent ratio |
|---|---|---|---|---|
| Li, Re-MOR | 0.06 | 0.89 | 0.12 | — |
| Li, Re-ZSM-3 | 0.05 | 0.89 | 0.01 | 0.02 |
| Li, Re-LTA | 0.08 | 0.97 | 0.01 | — |

EXAMPLE 2

Adsorption isotherms for nitrogen ($N_2$) and oxygen ($O_2$) on trivalent ion, lithium zeolites were measured gravimetrically using a Cahn 2000 Series microbalance enclosed in a stainless steel vacuum/pressure system. Pressure measurements in the range 1–10000 mbar were made using a MKS Baratron. About 100 mg of the sample was carefully evacuated and its temperature increased to 400° C. at a rate of 1°–2° C. per minute. The adsorption isotherms for nitrogen and oxygen were measured at 25° C. in the pressure range 20–6800 mbar for nitrogen and 20–2000 mbar for oxygen and the data fitted to a single or multiple site Langmuir isotherm model. The fits to the nitrogen data were used to calculate the nitrogen capacities of the samples at 1 atmosphere, and their effective capacities for nitrogen at 25° C. The effective nitrogen capacity defined as the difference between the nitrogen capacity at 1250 mbar and that at 250 mbar gives a good indication of the capacity of the adsorbent in a PSA process operated between upper and lower pressures in this range. The selectivities of the samples for nitrogen over oxygen in air at 1500 mbar and 25° C. were derived from the pure gas isotherms for nitrogen and oxygen using Langmuir mixing rules (Ref. e.g. A.L. Myers: AIChE: 29(4), (1983), pp 691–693. The usual definition for selectivity was used, where the selectivity (S) is given by:

$$S=(x_{N2}/y_{N2})/(x_{O2}/y_{O2})$$

where $x_{N2}$ and $x_{O2}$ are the mole fractions of nitrogen and oxygen, respectively, in the adsorbed phase, and $y_{N2}$ and $y_{O2}$ are the mole fractions of nitrogen and oxygen, respectively, in the gas phase.

The adsorption results for the trivalent ion, lithium X and LSX samples of Example 1 are given in Table 2.

TABLE 2

Adsorption Data for trivalent, lithium zeolites of this invention.

| Sample | $N_2$ Uptake 1 atm. mmol/g | Effective $N_2$ Uptake 1250–250 mbar mmol/g | Selectivity $N_2/O_2$ 1500 mbar (air) |
|---|---|---|---|
| Li, Re-MOR | 1.0485 | 0.6644 | 6.526 |
| Li, Re-ZSM-3 | 0.8207 | 0.5794 | 9.079 |

Although the invention has been described with particular reference to specific experiments, these experiments are merely exemplary of the invention and variations are contemplated. For example, the adsorption process can include various adsorption steps. Similarly the adsorbents of the invention can comprise other combinations of components than those illustrated in the examples, and the adsorbents can be prepared by other techniques, such as solid state ion exchange. Furthermore, the adsorbents of the invention can be used to separate nitrogen from various other gases, such as methane and carbon tetrafluoride. The scope of the invention is limited only by the breadth of the appended claims.

What is claimed is:

1. A zeolite selected from chabazite, offretite, erionite, levyne, mordenite, gmelinite, zeolite A, zeolite T, EMC-2, ZSM-3, ZSM-18, ZK-5, zeolite L, beta zeolite, and mixtures of these whose exchangeable cations comprise about 50 to about 95% lithium, about 4 to about 50% trivalent ions selected from aluminum, scandium, gallium, iron (III), chromium (III), indium, yttrium, single lanthanides, mixtures of two or more lanthanides and mixtures of these, and 0 to about 15% of residual exchangeable ions selected from sodium, potassium, ammonium, hydronium, calcium, strontium, magnesium, barium, zinc, copper II and mixtures of these.

2. The zeolite of claim 1, wherein said exchangeable cations comprise about 70 to about 95% lithium, about 5 to about 30% of said trivalent ions and 0 to about 10% of said residual ions.

3. The zeolite of claim 1 or claim 2, wherein said trivalent ions are selected from aluminum, cerium, lanthanum, mixtures of two or more lanthanides in which the total lanthanum, cerium, praseodymium and neodymium ions present in the mixture comprises at least 50% of the total lanthanide ions, and mixtures of these.

4. The zeolite of claim 1 or claim 2, wherein said residual exchangeable ions are selected from hydronium ion, calcium, strontium, magnesium, zinc, copper II and mixtures of these.

5. The zeolite of claim 1, wherein said exchangeable cations consist substantially of lithium and said trivalent ions.

6. A method of separating nitrogen from a gas mixture comprising passing said gas mixture through at least one adsorption zone containing an adsorbent selected from chabazite, offretite, erionite, levyne, mordenite, gmelinite, zeolite A, zeolite T, EMC-2, ZSM 3, ZSM-18, ZK-5, zeolite L, beta zeolite, and mixtures of these whose cations comprise about 50 to about 95% lithium, about 4 to about 50% trivalent ions selected from aluminum, scandium, gallium, iron (III), chromium (III), indium, yttrium, single lanthanides, mixtures of two or more lanthanides, and mixtures of these, and 0 to about 15% of residual exchangeable ions selected from sodium, potassium, ammonium, calcium, strontium, magnesium, barium, zinc, copper II and mixtures of these, thereby preferentially adsorbing nitrogen from said gas mixture.

7. The method of claim 6, further comprising desorbing nitrogen from said at least one adsorption zone.

8. The method of claim 6 or claim 7, wherein said trivalent ions are selected from aluminum, cerium, lanthanum, mixtures of two or more lanthanides, and mixtures of these.

9. The method of claim 6 or claim 7, wherein said residual exchangeable ions are selected from hydronium ion, calcium, strontium, magnesium, zinc, copper (II) and mixtures of these.

10. The method of claim 6, wherein said exchangeable cations comprise about to about 95% lithium, about 5 to about 30% of said trivalent ions and 0 to about 10% of said residual exchangeable ions.

11. The process of claim 6, wherein the preferential adsorption of nitrogen from said gas mixture is carried out at a temperature in the range of about −190° to about 70° C. and an absolute pressure in the range of about 0.7 to 15 bar.

12. The process of claim 6, wherein said method is a cyclic adsorption process selected from pressure swing adsorption, temperature swing adsorption or a combination of these.

13. The process of claim 12, wherein said cyclic adsorption process is pressure swing adsorption and said adsorbent is regenerated at an absolute pressure in the range of about 100 to about 5000 millibar.

14. The process of claim 13, wherein the preferential adsorption of nitrogen from said gas mixture is carried out at a temperature in the range of about −20° to about 50° C. and an absolute pressure in the range of about 0.8 to 10 bar.

15. The process of claim 13, wherein the preferential adsorption of nitrogen from said gas mixture is carried out at a temperature in the range of about −190° to about 70° C. and an absolute pressure in the range of about 0.8 to 10 bar.

16. The process of claim 12, wherein said cyclic adsorption process is temperature swing adsorption and said adsorbent is regenerated at a temperature in the range of about −50° to about 300° C.

17. A cyclic adsorption process for separating nitrogen from a gas mixture comprising nitrogen and one or more of oxygen, argon, helium and hydrogen comprising the steps:

(a) passing said gas mixture through at least one adsorption zone containing as adsorbent a zeolite selected from chabazite, offretite, erionite, levyne, mordenite, gmelinite, zeolite A, zeolite T, EMC-2, ZSM-3, ZSM-18, ZK-5, zeolite L, beta zeolite, and mixtures of these whose exchangeable cations comprise about 50 to about 95% lithium, about 4 to about 50% trivalent ions selected from aluminum, cerium, lanthanum, mixtures of two or more lanthanides in which the combined weight of lanthanum, cerium, praseodymium and neodymium ions present in the mixture comprises at least 50% of the total weight of the mixture, and mixtures of these, and 0 to about 10% of residual exchangeable ions selected from sodium, potassium, hydronium, ammonium, calcium, strontium, magnesium, barium, zinc, copper (II) and mixtures of these, thereby preferentially adsorbing nitrogen from said gas mixture; and (b) desorbing nitrogen from said at least one adsorption zone.

18. The process of claim 17, wherein said cyclic adsorption process is selected from pressure swing adsorption, temperature swing adsorption or a combination of these.

19. The process of claim 18, wherein the preferential adsorption of nitrogen from said gas mixture is carried out at a temperature in the range of about −190° to about 70° C. and an absolute pressure in the range of about 0.7 to 15 bar.

20. The process of claim 19, wherein said cyclic adsorption process is pressure swing adsorption and said adsorbent is regenerated at an absolute pressure in the range of about 100 to about 5000 millibar.

21. The process of claim 20, wherein the preferential adsorption of nitrogen from said gas mixture is carried out at a temperature in the range of about −20° to about 50° C. and an absolute pressure in the range of about 0.8 to 10 bar.

22. The process of claim 19, wherein said cyclic adsorption process is temperature swing adsorption and said adsorbent is regenerated at a temperature in the range of about 0° to about 300° C.

23. The process of claim 17, wherein said adsorbent is at least partly regenerated by countercurrent depressurization.

24. The process of claim 23, wherein said adsorbent is further regenerated by depressurization to subatmospheric pressure by means of vacuum.

25. The process of claim 23 or claim 24, wherein said adsorbent is further regenerated by purging the bed with the gas mixture from which nitrogen has been adsorbed in step (a).

* * * * *